(12) United States Patent
Kawaji et al.

(10) Patent No.: US 10,453,426 B2
(45) Date of Patent: Oct. 22, 2019

(54) VEHICULAR HEAD-UP DISPLAY APPARATUS HAVING FIRST AND SECOND LUMINANCE AREAS

(71) Applicant: KYOCERA Corporation, Kyoto (JP)

(72) Inventors: Satoshi Kawaji, Yokohama (JP);
Yusuke Hayashi, Fort Lee, NJ (US);
Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/064,357

(22) PCT Filed: Dec. 21, 2016

(86) PCT No.: PCT/JP2016/088235
§ 371 (c)(1),
(2) Date: Jun. 20, 2018

(87) PCT Pub. No.: WO2017/110941
PCT Pub. Date: Jun. 29, 2017

(65) Prior Publication Data
US 2019/0005921 A1    Jan. 3, 2019

(30) Foreign Application Priority Data

Dec. 22, 2015   (JP) ................................. 2015-250524

(51) Int. Cl.
*G09G 5/14*     (2006.01)
*B60K 35/00*    (2006.01)
(Continued)

(52) U.S. Cl.
CPC ............... *G09G 5/14* (2013.01); *B60K 35/00* (2013.01); *G02B 27/01* (2013.01);
(Continued)

(58) Field of Classification Search
None
See application file for complete search history.

(56) References Cited

U.S. PATENT DOCUMENTS 6,720,938 B2 *   4/2004   Ohkawara ................ G09G 5/00
                                                     340/903
10,133,066 B2    11/2018  Yamaoka
(Continued)

FOREIGN PATENT DOCUMENTS

JP    2001315547 A    11/2001
JP    2003-104087 A    4/2003
(Continued)

*Primary Examiner* — Jason A Pringle-Parker
(74) *Attorney, Agent, or Firm* — Studebaker & Brackett PC

(57) ABSTRACT

A vehicular head-up display apparatus comprises a light source apparatus, a display panel, an optical member, and a controller. The display panel is configured to change illumination light from the light source apparatus into display light on a display surface. The optical member is configured to guide the display light from the display panel to a certain space. The display surface includes a first luminance area displayable at a first luminance, and a second luminance area displayable at a second luminance which is lower in luminance than the first luminance. The controller is configured to selectively display information in the first luminance area and the second luminance.

5 Claims, 4 Drawing Sheets

(51) Int. Cl.
*G02B 27/01* (2006.01)
*G09G 5/02* (2006.01)
*G09G 3/00* (2006.01)
*G09G 5/37* (2006.01)

(52) U.S. Cl.
CPC ......... *G02B 27/0101* (2013.01); *G09G 3/001* (2013.01); *G09G 5/02* (2013.01); *G09G 5/37* (2013.01); *B60K 2370/155* (2019.05); *B60K 2370/1529* (2019.05); *B60K 2370/31* (2019.05); *B60K 2370/334* (2019.05); *B60K 2370/343* (2019.05); *G02B 2027/0141* (2013.01); *G09G 2320/0271* (2013.01); *G09G 2320/0686* (2013.01); *G09G 2380/10* (2013.01)

(56) References Cited

U.S. PATENT DOCUMENTS

| | | | |
|---|---|---|---|
| 2001/0040534 | A1 | 11/2001 | Ohkawara et al. |
| 2003/0112132 | A1* | 6/2003 | Trajkovic ............... B60K 35/00 340/435 |
| 2008/0012697 | A1* | 1/2008 | Smith ................... B60K 35/00 340/438 |
| 2009/0303447 | A1* | 12/2009 | Turner ................... G03B 21/28 353/51 |
| 2012/0313909 | A1* | 12/2012 | Ishida .................. G02B 26/101 345/207 |
| 2013/0002414 | A1* | 1/2013 | Konet ................... B60K 37/06 340/436 |
| 2014/0002252 | A1* | 1/2014 | Fong ...................... B60Q 9/008 340/435 |
| 2015/0316765 | A1* | 11/2015 | Kim ....................... H04N 5/247 345/7 |
| 2016/0073031 | A1* | 3/2016 | Watanabe ............. G02F 1/0121 345/7 |
| 2016/0170205 | A1* | 6/2016 | Yamaoka ............... B60K 35/00 359/630 |

FOREIGN PATENT DOCUMENTS

| | | |
|---|---|---|
| JP | 2011-166396 A | 8/2011 |
| JP | 2014222308 A | 11/2014 |

* cited by examiner

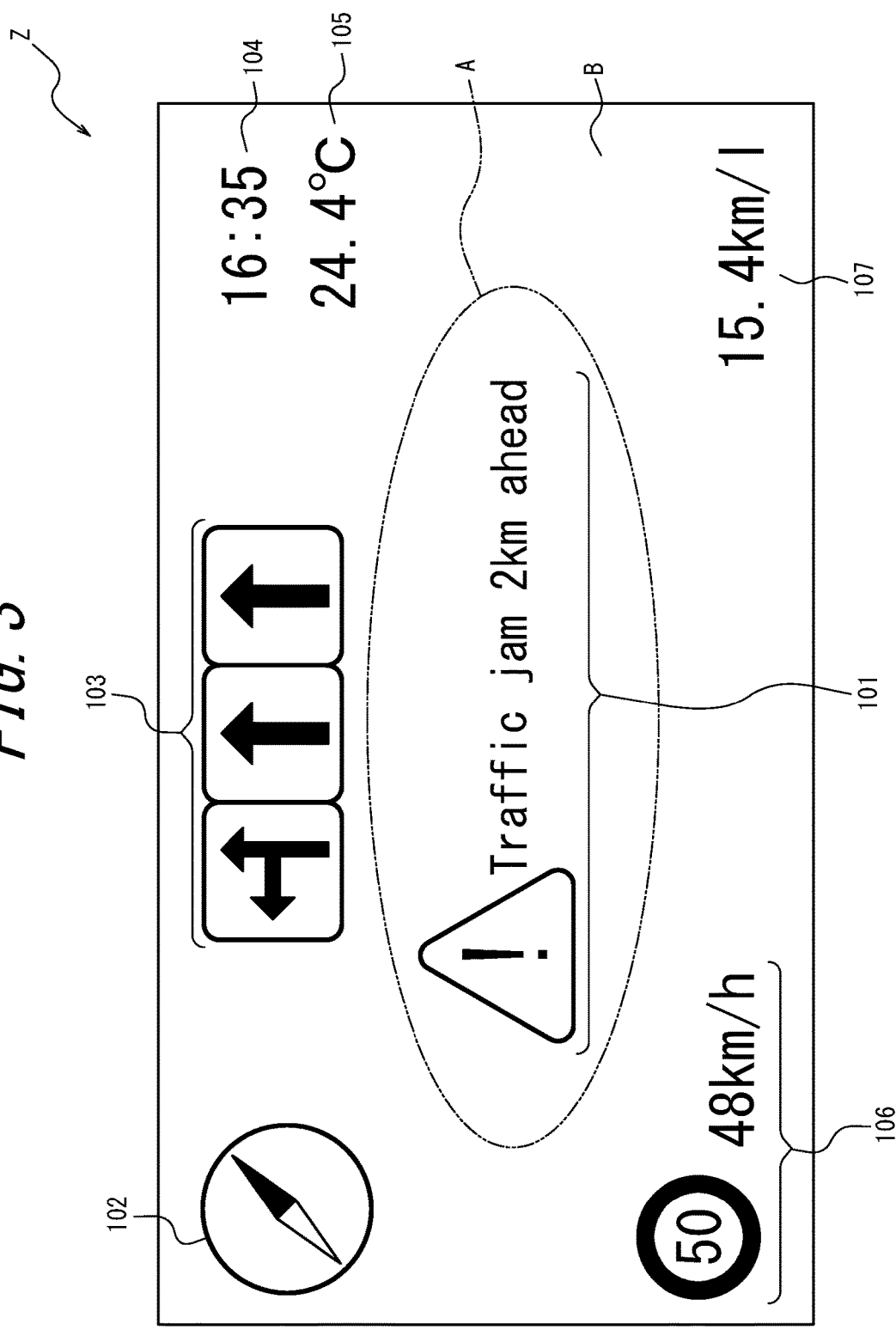

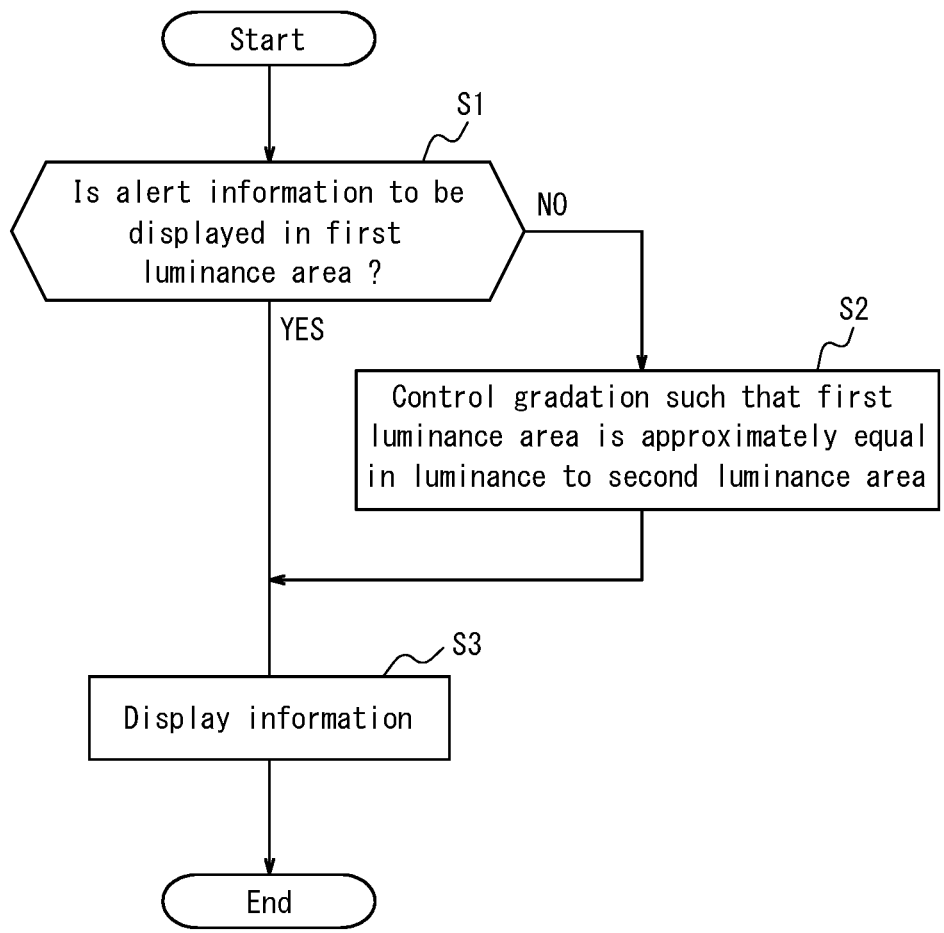

VEHICULAR HEAD-UP DISPLAY APPARATUS HAVING FIRST AND SECOND LUMINANCE AREAS

CROSS-REFERENCE TO RELATED APPLICATION

The present application claims priority to and the benefit of Japanese Patent Application No. 2015-250524 filed Dec. 22, 2015, the entire contents of which are incorporated herein by reference.

TECHNICAL FIELD

The present disclosure relates to a vehicular head-up display apparatus.

BACKGROUND

Vehicular head-up display apparatuses are used to reflect light transmitted through a display panel of a projection unit to a semi-transmissive plate such as a windshield of a vehicle. The reflected light causes an operator of the vehicle to recognize a virtual image of a display surface of the display panel.

The operator of the vehicle visually recognizes the virtual image of the display surface from the front direction of the display surface. The vehicular head-up display apparatus is such that the luminance in the front direction of the display surface is higher than that in an oblique direction. In order to increase the luminance in the front direction of the display panel, the vehicular head-up display apparatus may include a diffusion plate which is high in total light transmittance and parallel light transmittance. However, in the vehicular head-up display apparatus, as the parallel light transmittance increases, unevenness tends to occur in the luminance in the front direction of the display surface.

SUMMARY

A vehicular head-up display apparatus according to an embodiment of the present disclosure comprises a light source apparatus, a display panel, an optical member, and a controller. The display panel is configured to change illumination light from the light source apparatus into display light on a display surface. The optical member is configured to guide the display light from the display panel to a certain space. The display surface includes a first luminance area displayable at a first luminance, and a second luminance area displayable at a second luminance which is lower in luminance than the first luminance. The controller is configured to selectively display information in the first luminance area and the second luminance area.

BRIEF DESCRIPTION OF THE DRAWINGS

In the accompanying drawings:

FIG. 3 is a schematic view illustrating an example of the virtual image surface in FIG. 1; and FIG. 4 is a flowchart illustrating processing performed by the controller in FIG. 1.

DETAILED DESCRIPTION

An embodiment according to the present disclosure will be described in detail with reference to the accompanying drawings.

Figure 1:
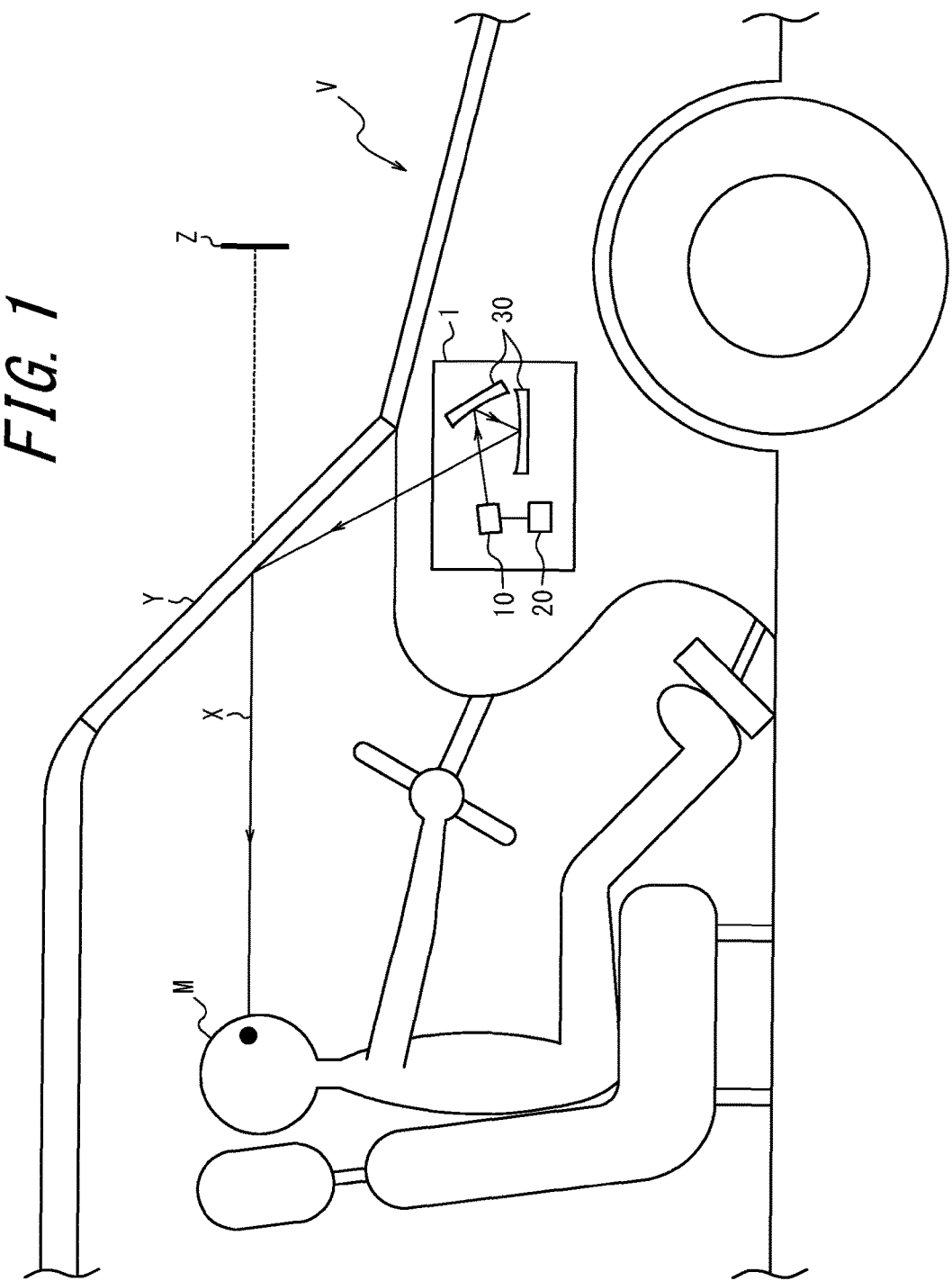
FIG. 1 illustrates the schematic configuration of a vehicular head-up display apparatus according to an embodiment of the present disclosure.

A vehicular head-up display apparatus 1 according to one of the disclosed embodiments will be described with reference to FIG. 1. The vehicular head-up display apparatus 1 includes a display 10, a controller 20, and a projection optical system 30. The vehicular head-up display apparatus 1 is accommodated, for example, in a dashboard of a vehicle V. The vehicular head-up display apparatus 1 is configured to emit display light X. The emitted display light X is reflected by a semi-transmissive plate Y such as a windshield of the vehicle V. The reflected display light X is then incident on the eyeballs of an operator M, such as a driver or the like, of the vehicle V. In this manner, when the display light X is incident on the eyeballs of the operator M, a virtual image visible to the operator M is generated as a virtual image surface Z at a certain position in front of the semi-transmissive plate Y.

The display 10 includes a light source apparatus, a transmissive display panel, and the like. Illumination light emitted from the light source apparatus is configured to pass through the transmissive display panel. The illumination light passed through the display panel is then emitted to the outside of the display 10. When passing through the display panel, the intensity of each wavelength of the illumination light is attenuated according to a requested image. The illumination light becomes the display light X by passing through the display panel. Details of the display 10 will be described later.

The controller 20 includes, for example, a micro computer or the like. The micro computer has a nonvolatile storage area and a processor configured to execute a control program stored in the storage area. The controller 20 controls display on the display panel of the display 10. More particularly, the controller 20 is capable of controlling the gradation of a display color in the first luminance area A on the virtual image surface Z by controlling the gradation of the display color on the display panel of the display 10. A term "gradation" and a term "number of shades" are synonymous.

The projection optical system 30 is configured to guide the display light X from the display 10 to the semi-transmissive plate Y. The projection optical system 30 can enlarge the extent over which the display light X is projected. The projection optical system 30, for example, has an optical member such as a mirror constituted by a concave mirror or the like. The projection optical system 30 guides the display light X from the inside of the vehicular head-up display apparatus 1 towards the semi-transmissive plate Y by reflection. As an example illustrated in FIG. 1, the projection optical system 30 has two mirrors, however, the number of mirrors is not limited to two.

The semi-transmissive plate Y is an optical member that reflects a part of the incident light. That is, the semi-transmissive plate Y can transmit a part of the incident light. The semi-transmissive plate Y can be included in the vehicle V. Other than the windshield of the vehicle V, the semi-transmissive plate Y may be a combiner configured to reflect the display light X from the vehicular head-up display apparatus 1, or the like. The semi-transmissive plate Y such as a combiner or the like can be included in the vehicular head-up display apparatus 1. The semi-transmissive plate Y is configured to reflect a part of the display light X radiated from the vehicular head-up display apparatus 1 towards a space in which it is assumed that the eyes of the operator M are present. The space in which it is assumed that the eyes of the operator M are present may be called an eye-box.

The virtual image surface Z is a virtual image visually recognized by the operator M through the display light X reflected by the semi-transmissive plate Y. The operator M is under the illusion that the virtual image surface Z is a surface in front of the vehicle V. The operator M visually recognizes the virtual image surface Z as overlapped with the scenery or the like outside the vehicle. The display surface of the display panel 12 has an uneven luminance distribution (luminance unevenness), including an area relatively high in luminance and an area relatively low in luminance Details of the uneven luminance distribution of the display surface will be described later.

Figure 2:
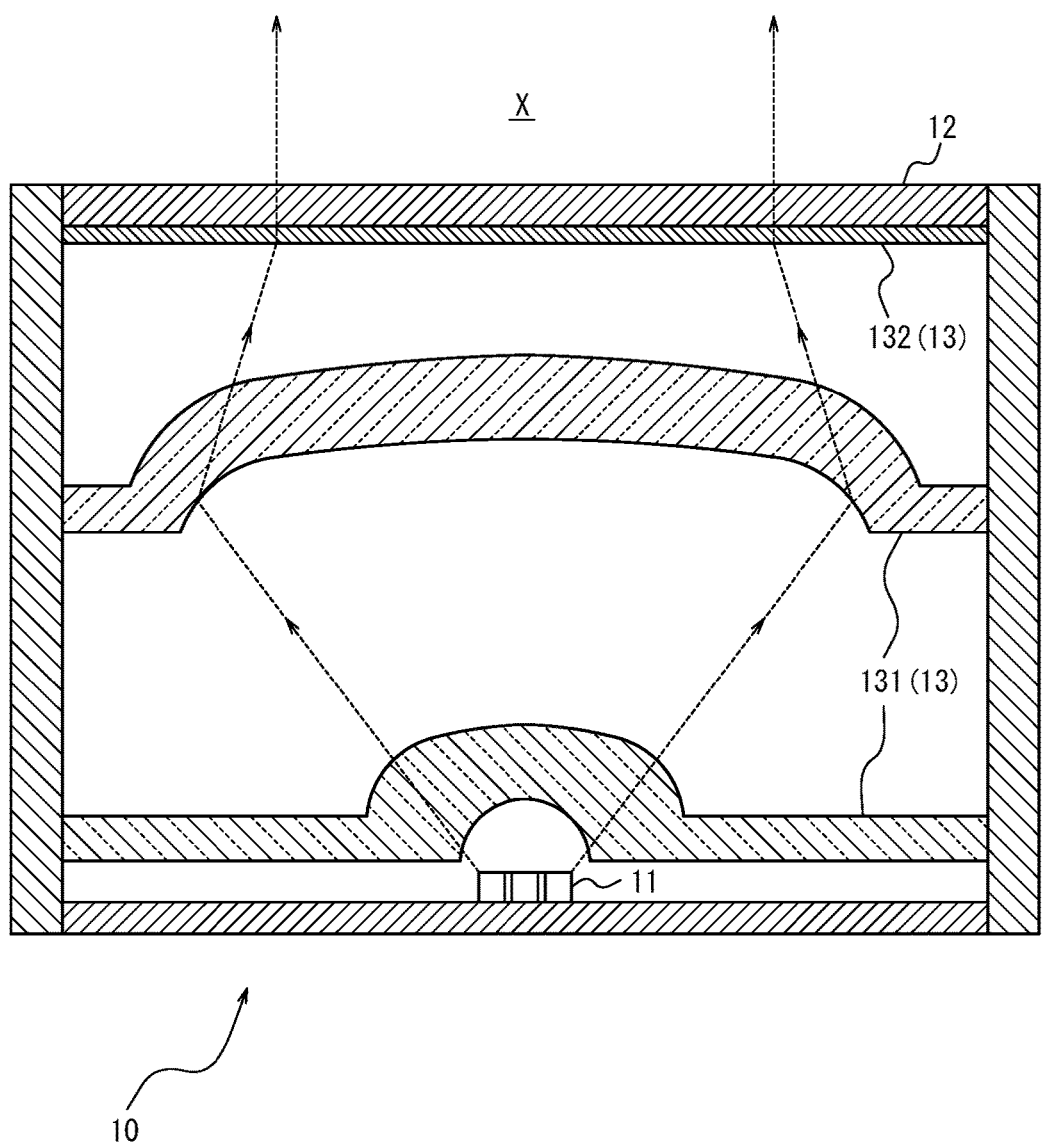
FIG. 2 illustrates the schematic configuration of the display in FIG. 1.

Next, the schematic configuration of the display 10 will be described with reference to FIG. 2. The display 10 includes a light source apparatus 11, a display panel 12, and an illumination optical system 13.

The light source apparatus 11 is a member that emits illumination light. The light source apparatus 11 includes, for example, one or a plurality of LEDs (Light Emitting Diode) which emit white light divergently. The illumination light emitted from the light source apparatus 11 is configured to pass through the illumination optical system 13 and then irradiate the display panel 12.

The light source apparatus 11 is located at a position where illumination light can be emitted to the display panel 12. The light source apparatus 11 may be located at the rear side of the display panel 12. When uneven illumination light enters the display panel 12, uneven luminance distribution occurs on the display surface of the display panel 12. Further, the light source apparatus 11 may include a plurality of LEDs. As illustrated in FIG. 2, each LED included in the light source apparatus 11 may be located at a position on a surface parallel to the display panel 12 and close to the intersection point of the surface and a perpendicular line from the center of the display panel 12, such that can be regarded as a point light source. The plurality of LEDs included in the light source apparatus 11 may, for example, be arranged on the surface parallel to the display panel 12 asymmetrically with respect to the perpendicular line from the center of the display panel 12.

The display panel 12 is a transmissive display panel. The display panel 12 includes a liquid crystal display panel and a MEMS shutter panel. The liquid crystal panel may include, for example, a polarizing filter, a glass substrate, a transparent electrode, an oriented film, a liquid crystal display element, a color filter, and the like. When the illumination light irradiated from the illumination optical system 13 enters the display panel 12, the transmitted light is emitted as the display light X. The display light X is light corresponding to an image displayed on the display surface of the display panel 12. When a color image is displayed on the display surface of the display panel 12, the display light X becomes light corresponding to the color image. When the image displayed on the display surface of the display panel 12 changes, the display light X changes accordingly. The image displayed on the display surface of the display panel 12 is controlled by the controller 20. The controller 20 can control the display light X by controlling the image displayed on the display surface of the display panel 12.

The illumination optical system 13 is located between the light source apparatus 11 and the display panel 12. The illumination optical system 13 is configured to guide the illumination light from the light source apparatus 11 to the display panel 12. The illumination optical system 13 mainly includes lenses 131 and a diffusion plate 132. The illumination optical system 13 is configured to guide the illumination light from the light source apparatus 11 to the display panel 12 through the lenses 131 and the diffusion plate 132.

The lenses 131 are configured to focus or converge the illumination light divergently emitted from the light source apparatus 11. The lenses 131 are capable of changing the direction in which the optical paths of the incident illumination light spread. The diverged illumination light is converged by the lenses 131. The illumination light focused by the lenses 131 travels towards the diffusion plate 132. FIG. 2 illustrates an example in which two lenses 131 are provided. The number of lenses 131, however, is not limited to two.

The diffusion plate 132 is provided so as to cover the surface of the display panel 12 on the light source apparatus 11 side, and is configured to diffuse the illumination light from the lenses 131 and transmit the light to the display panel 12 side. The diffusion plate 132 may have a characteristic such that it is relatively high in parallel light transmittance. When the diffusion plate 132 is relatively high in parallel light transmittance, it can control the decrease in the luminance in the front direction of the display panel 12. On the other hand, when the diffusion plate 132 is high in parallel light transmittance, the diffuse transmittance decreases, thus unevenness may occur in the luminance in the front direction of the display panel 12. The luminance in the front direction of the display surface of the display panel 12 may be referred to as a first luminance.

Next, an example of the virtual image surface Z caused by the vehicular head-up display apparatus 1 will be described with reference to FIG. 3. The display light X from the display surface of the display panel 12 may be uneven in luminance distribution. The display surface of the display panel 12 may include a first luminance area displayable at a first luminance which is relatively high in luminance, and a second luminance area displayable at a second luminance which is lower in luminance than the first luminance. The luminance distribution of the display light X corresponds to the luminance distribution of the display surface. The unevenness of the luminance distribution of the display light X from the display 10 causes uneven luminance distribution on the virtual image surface Z. The virtual image surface Z may include a first luminance area A with a relatively high displayable luminance, and a second luminance area B with a displayable luminance lower than that of the first luminance area A. The uneven luminance distribution of the display light X is caused by the configurations of the light source apparatus 11 and the illumination optical system 13 which are included in the display 10.

Further, in FIG. 3, the first luminance area A is located at a center part of the virtual image surface Z, and the second luminance area B is located at a peripheral part surrounding the center part. The positional relationship and the ranges of the first luminance area A and the second luminance area B, however, are not limited to the embodiment illustrated in FIG. 3. For example, the first luminance area A and the second luminance area B may be arranged in a vertical direction or a horizontal direction on the virtual image surface Z. The luminance of the first luminance area A may be 1.4 times or more the luminance of the second luminance area B.

The virtual image surface Z is configured to selectively display information. The first luminance area A and the second luminance area B may display different kinds of information. The first luminance area A may preferentially display a certain kind of information. For example, the first luminance area A may display information to which the operator M of the vehicle V should particularly pay attention (hereinafter, described as "alert information" as appropriate). The alert information may include, for example, traffic jam information 101 as illustrated in FIG. 3, road block information, construction regulation information, accident information, speed limit exceeded information, navigation information, pedestrian approach information, signal information, forward vehicle start information, fuel exhaustion information, puncture information, road surface freezing information, a shift change reminder, and the like. Among the alert information, the first luminance area A may preferentially display information to which attention should be prioritized. The second luminance area B may display information other than the alert information. The second luminance area B may also display information with relatively low priority among the alert information. The information other than the alert information may include, for example, as illustrated in FIG. 3, azimuth information 102, lane information 103, time information 104, temperature information 105, speed limit/vehicle speed information 106, average fuel efficiency information 107, and the like. The information other than the alert information may also include fuel remaining amount or battery remaining amount, drivable distance, engine speed, turning signal, light switch position, various setting of air conditioner, fresh air introduction setting, and the like. The alert information and the other information may include relevant information. For example, the speed limit exceeded information and the speed limit/vehicle speed information 106 may be considered as relevant information. In another example, the fuel exhaustion information and the fuel remaining amount or battery remaining amount, or the drivable distance may be considered as relevant information. In yet a further example, the road surface freezing information and the temperature information may be considered as relevant information.

The selective display of information in each area of the virtual image surface Z is realized by the controller 20 selectively controlling in which area of the display panel 12 the information is to be displayed. When alert information with higher priority than the alert information currently being displayed is generated, the controller 20 is configured to selectively display the alert information with higher priority. The controller 20 is configured to store correspondence information on, which information is to be displayed in the first luminance area A or the second luminance area B of the virtual image surface Z in a certain situation, in advance. Based on the correspondence information, the controller 20 controls the display of information on the display panel 12. For example, when the navigation information is displayed in the first luminance area A, the speed limit exceeded information will be selectively displayed instead of the navigation information once the speed limit is exceeded.

The controller 20 can selectively change the luminance of the first luminance area A according to whether there is alert information. When there is alert information in a certain situation, the controller 20 can increase the luminance of the first luminance area A. When there is no alert information in a certain situation, the controller 20 can decrease the luminance of the first luminance area A. When there is no alert information in a certain situation, the controller 20 can change the luminance of the first luminance area A so as to be approximately equal to that of the second luminance area B. When there is no alert information in a certain situation, the controller 20 can cause the first luminance area A to display information other than the alert information. The controller 20 can control the luminance of the first luminance area A by changing the gradation of the display panel 12. The controller 20 is configured to cause the first luminance area A and the second luminance area B to display the same information with different gradations.

The vehicular head-up display apparatus 1 can cause the first luminance area A and the second luminance area B included in the virtual image surface Z to selectively display information. The vehicular head-up display apparatus 1, for example, can cause the first luminance area A which is high in luminance and more conspicuous to display the alert information so as to improve visibility.

Next, the processing performed by the controller 20 of the vehicular head-up display apparatus 1 will be described with reference to the flowchart illustrated in FIG. 4.

When the information to be displayed in the first luminance area A of the virtual image surface Z includes the alert information (Step S1: YES), the controller 20 causes the virtual image surface Z to display the information without changing the gradation of the display color for the information to be displayed in the first luminance area A (Step S3) and terminates the processing. On the other hand, when the information to be displayed in the first luminance area A of the virtual image surface Z does not include the alert information (Step S1: NO), the controller 20 controls the gradation of the display color in the first luminance area A such that the first luminance area A is approximately equal in luminance to the second luminance area B in a simulated manner (Step S2). Then, the controller 20 causes the virtual image surface Z to display the information (Step S3) and terminates the processing.

By performing this processing, the vehicular head-up display apparatus 1 controls the gradation of the display color in the first luminance area A such that the first luminance area A is approximately equal in luminance to the second luminance area B in a simulated manner, when the alert information is not displayed in the first luminance area A. Accordingly, when the alert information is displayed, it can be displayed in the first luminance area A in a conspicuous manner. On the other hand, when the alert information is not displayed, the information displayed in the first luminance area A and the information displayed in the second luminance area B can be displayed in an equivalent luminance. As a result, the visibility can be improved.

The present invention has been described based on the drawings and the embodiment, however, it should be noted that those skilled in the art can easily make various changes or modifications based on the present disclosure. Thus, such changes and modifications are to be understood as included within the scope of this disclosure. For example, functions and the like included in various components and steps may be reordered in any logically consistent way. Furthermore, components or steps may be combined into one or divided.

In addition, the light source apparatus 11 has been described as located at the rear side of the display panel 12. However, the present disclosure is not limited to such arrangement as long as the luminance distribution on the virtual image surface Z is uneven.

Further, it has been described that the lenses 131 are configured to focus the illumination light from the light source apparatus 11 and emit the light towards the display panel 12. However, the present disclosure is not limited to such configuration and the lenses 131 are not necessarily arranged as the illumination optical system 13, as long as the luminance distribution on the virtual image surface Z is uneven.

Moreover, it has been described that the diffusion plate 132 is provided so as to cover the surface of the display panel 12 at the light source apparatus 11 side. However, the present disclosure is not limited to such arrangement and the diffusion plate 132 is not necessarily arranged as the illumination optical system 13, as long as the luminance distribution on the virtual image surface Z is uneven.

REFERENCE SIGNS LIST

1 Vehicular head-up display apparatus
10 Display
11 Light source apparatus
12 Display panel
13 Illumination optical system
131 Lens
132 Diffusion plate
20 Controller
A First luminance area
B Second luminance area
M Operator
V Vehicle
X Display light
Y Semi-transmissive plate
Z Virtual image surface

The invention claimed is:

1. A vehicular head-up display apparatus, comprising
a display comprising:
    a light source apparatus;
    a display panel configured to change illumination light from the light source apparatus into display light on a display surface;
    an illumination optical system configured to guide the illumination light from the light source apparatus to the display panel; and
    an optical guide that guides the display light from the display panel to a certain space; and
a controller, wherein
the display surface includes, due to unevenness of luminance distribution of the display light, a first luminance area displayable at a first luminance, and a second luminance area displayable at a second luminance which is lower in luminance than the first luminance, wherein the unevenness of the luminance distribution of the display light is caused by configurations of the light source apparatus and the illumination optical system,
the controller selectively displays information in the first luminance area and the second luminance area,
when alert information is displayed in the first luminance area, the controller does not change a number of shades of a display color in the first luminance area, and
when no alert information is displayed in the first luminance area, the controller controls the number of shades of the display color in the first luminance area such that luminance of the first luminance area substantially equals that of the second luminance area while keeping the unevenness of the luminance distribution of the display light.

2. The vehicular head-up display apparatus according to claim 1, wherein the light source apparatus is located at a rear side of the display panel.

3. The vehicular head-up display apparatus according to claim 2, wherein the illumination optical system comprises a lens to focus the illumination light and guide the light towards the display panel.

4. The vehicular head-up display apparatus according to claim 2, wherein the illumination optical system comprises a diffusion plate configured to diffuse the illumination light focused by the lens.

5. The vehicular head-up display apparatus according to claim 1, wherein
the first luminance area is located at a central part of the display surface, and
the second luminance area is located at a peripheral part surrounding the central part.

* * * * *